Sept. 22, 1970     J. W. RYAN ET AL     3,529,479

GEAR TRAIN AND CLUTCH FOR A SELF-PROPELLED TOY

Original Filed Feb. 3, 1967     4 Sheets-Sheet 1

INVENTORS
JOHN W. RYAN
ROBERT A. MacMEEKIN
DANIEL H. MEGGS

BY Max E. Shirk

ATTORNEY

Sept. 22, 1970   J. W. RYAN ET AL   3,529,479
GEAR TRAIN AND CLUTCH FOR A SELF-PROPELLED TOY
Original Filed Feb. 3, 1967   4 Sheets-Sheet 3

INVENTORS
JOHN W. RYAN
ROBERT A. MacMEEKIN
DANIEL H. MEGGS

By
Max E. Shirk
ATTORNEY

Sept. 22, 1970  J. W. RYAN ET AL  3,529,479
GEAR TRAIN AND CLUTCH FOR A SELF-PROPELLED TOY
Original Filed Feb. 3, 1967  4 Sheets-Sheet 4
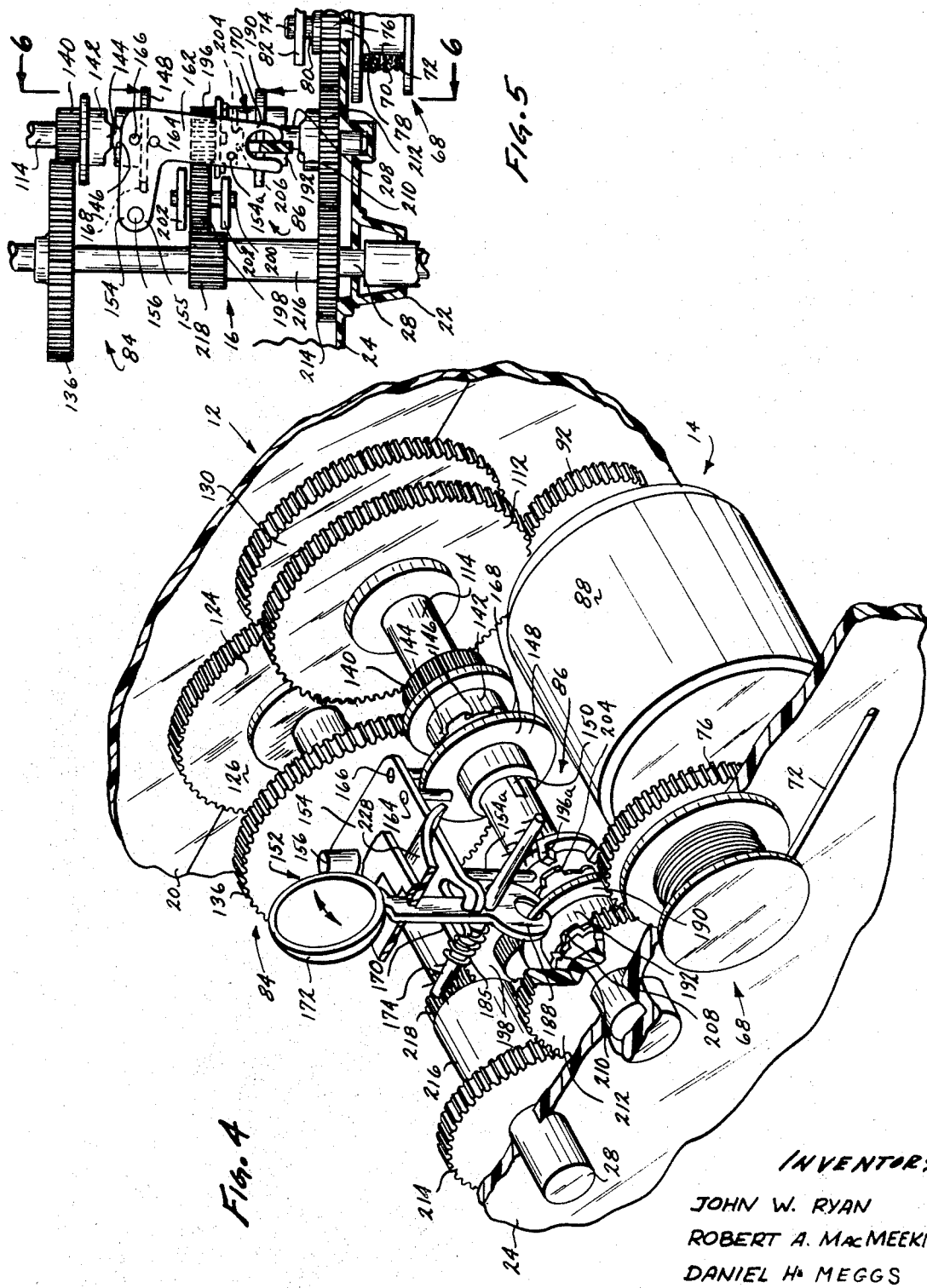
INVENTORS
JOHN W. RYAN
ROBERT A. MacMEEKIN
DANIEL H. MEGGS
BY
Max E. Shirk
ATTORNEY

United States Patent Office 3,529,479
Patented Sept. 22, 1970

3,529,479
GEAR TRAIN AND CLUTCH FOR A
SELF-PROPELLED TOY
John W. Ryan, Los Angeles, Robert A. MacMeekin, Huntington Beach, and Daniel H. Meggs, Torrance, Calif., assignors to Mattel, Inc., Hawthorne, Calif., a corporation of Delaware
Original application Feb. 3, 1967, Ser. No. 613,864, now Patent No. 3,475,854, dated Nov. 4, 1969. Divided and this application Aug. 22, 1969, Ser. No. 852,278
Int. Cl. A63h *17/00, 17/26*
U.S. Cl. 74—15.4  5 Claims

ABSTRACT OF THE DISCLOSURE

A gear train and clutch arrangement may be operated manually to shift the output of a winch-carrying electric toy vehicle having wheel substitutes from the wheel substitutes to the winch. The clutch includes axially slidable members having protuberances which are biased into engagement with matching detents carried by clutch members fixed to the axle. The clutch automatically shifts the output from the winch to the wheel substitutes when the winch encounters a predetermined load.

CROSS REFERENCE TO RELATED APPLICATION

This application is a division of application No. 613,864 filed Feb. 3, 1967, now Pat. No. 3,475,854.

BACKGROUND OF THE INVENTION

The background of the invention is set forth in two parts:

Field of the invention

The present invention pertains generally to the field of electric toys and more particularly to a gear train and clutch arrangement for an electric, motor-operated toy simulating a land vehicle having a winch and a pair of wheel substitutes. Each wheel substitute includes spider-type engagement means constructed and arranged to give the simulated land vehicle erratic movement while permitting it to operate as a step or abutment ascending type vehicle.

Description of the prior art

Toys which place a child in an imagined space-age environment are presently quite popular. In addition, children of all ages are fascinated by electric, motor-operated toys of the simulated land vehicle type. Although a number of toys placing a child in a simulated space-age, environment and a number of electric, motor-operated, simulated land vehicle toys are available, the toys adapted to place a child in a simulated space-age environment are not of the simulated land vehicle type and, conversely, the simulated land vehicles are not of a type especially designed for placing a child in a space-age play environment.

SUMMARY OF THE INVENTION

In view of the foregoing, it is a primary object of the present invention to provide a new and useful gear train and clutch arrangement for a simulated land vehicle having wheel substitutes including a winch and spider-type engagement means especially designed for negotiating obstacles simulating moon craters and for imparting an erratic movement to the toy.

Another object of the present invention is to provide a toy of the type described which includes a powered winch and a gear train operatively associating the winch with an electric motor and wheel substitutes through a clutch means operable to energize either the wheel substitutes or the winch.

A further object of the present invention is to provide a toy of the type described including means for operating the toy in two different modes through a gear train and clutch arrangement which operates automatically to shift the toy from one operating mode to the other when a particular operating mode is subjected to a predetermined load.

According to the present invention, a self-propelled, crawling toy is provided. The toy includes a body having a front end, side walls and a tail. Motor means are mounted in the body in operative association with an axle means rotatably mounted in the front end of the body and having first and second ends extending laterally outwardly from the side walls. Hub means are keyed, through over-ride clutches, to the ends of the axle for rotation thereby and spokes extend radially outwardly from the hub means. The spokes include ground-engaging portions for moving the toy over a suitable surface upon rotation of the hub means and the spokes are of sufficient length that the circle inscribed by the ground-engaging portions extends forwardly of the body, whereby the ground-engaging portions are adapted to lift the body over obstacles placed in the path of travel of the toy. The spokes on one hub are spaced 45° out of phase with the spokes on the other hub so that the toy is given an erratic movement simulating a waddling action and facilitating movement of the toy over the obstacles.

A winch drum is rotatably mounted on the body and a gear train operatively associates the winch with the motor means through a clutching arrangement for selectively actuating the hub means to move the toy forwardly over the surface, to rotate the drum counterclockwise or to rotate the drum clockwise. When the winch is subjected to a predetermined load, the clutch means automatically disengages the gear train from the winch drum locks the winch and reengages the hub means. The hub means are connected to the axle through a slip-clutch arrangement for minimizing damage to the toy when a child restrains one hub means from rotating while attempting to rotate the other hub means through its associated spokes.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 4 is an enlarged, partial perspective view of the power plant of the toy of FIG. 1;

FIG. 5 is a partial cross-sectional view of the power plant shown in FIG. 4;

FIG. 6 is a partial, cross-sectional view taken along line 6—6 of FIG. 5;

FIG. 7 is a partial, cross-sectional view taken along line 7—7 of FIG. 6; and

FIG. 8 is an enlarged, partial elevational view of a hub and spoke assembly of the toy of FIG. 1.

DESCRIPTION OF THE PREFERRED EMBODIMENT

Figure 1:
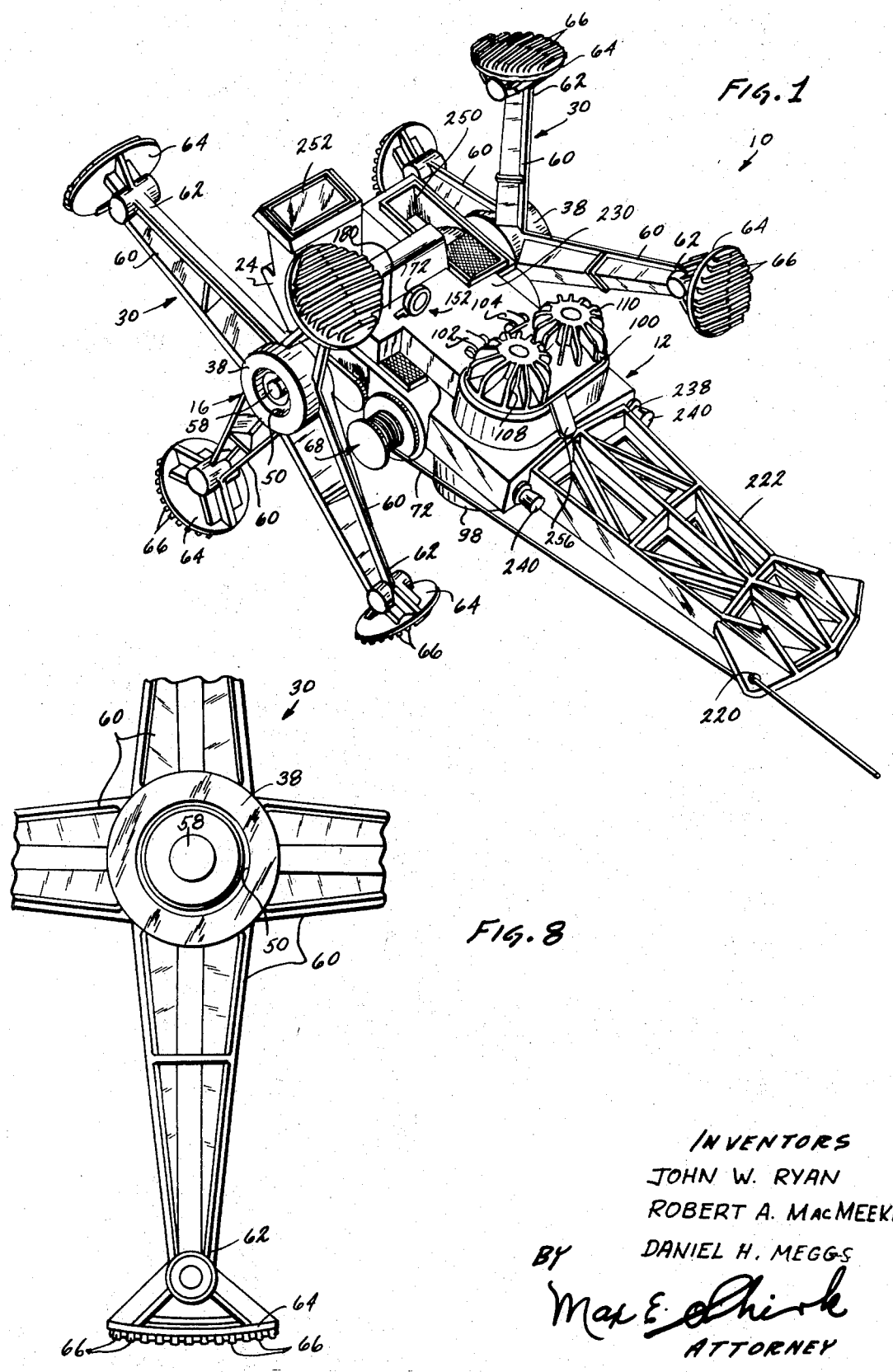
FIG. 1 is a perspective view of a self-propelled crawling toy constituting a presently preferred embodiment of the invention.
Figure 3:
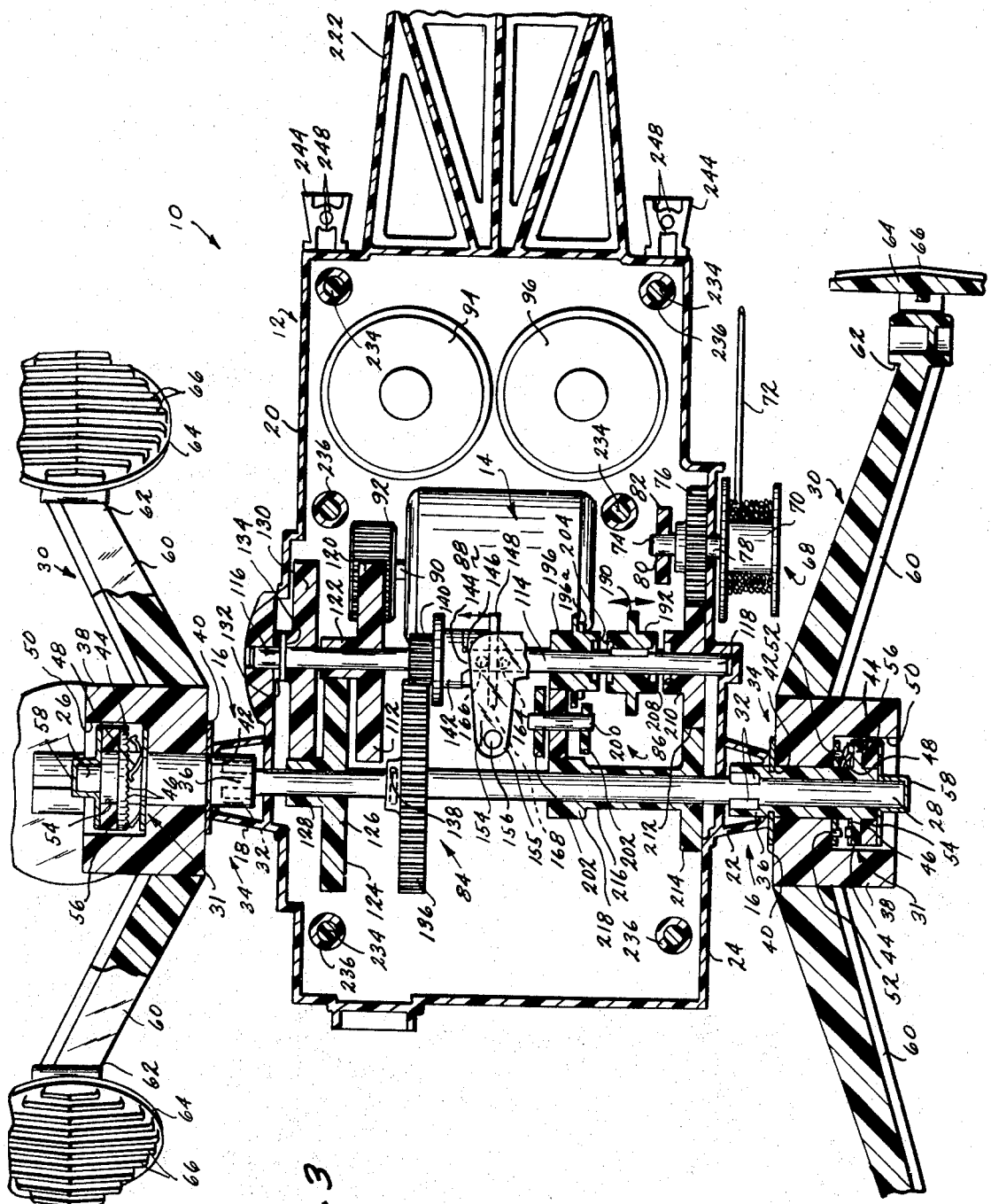
FIG. 3 is a partial, cross-sectional view taken along line 3—3 of FIG. 2.

Referring again to the drawings, and more particularly to FIGS. 1 and 3, a self-propelled, crawling toy constituting a presently preferred embodiment of the invention, generally designated 10, includes a body 12 in which a suitable motor means 14 is mounted in operative association with an axle means 16. The axle means 16 is journaled in a first hollow boss 18 extending laterally outwardly from a first side wall portion 20 of body 12 and a second holow boss 22 extending laterally outwardly from a second side wall portion 24 of body 12. The axle means 16 includes a first end 26 extending laterally outwardly from its associated boss 18 and a second end 28 extending laterally outwardly from its associated boss 22. A wheel substitute 30 is keyed, through a slip-clutch 31, to each end 26, 28 by an associated key 32 for rotation by the shaft means 16.

Each wheel substitute 30 includes a hub means 34 having a hollow spindle 36 keyed to the axle means 16 by the key 32 and rotatably receiving a hub member 38 which is retained in position thereon by a snap ring 40 received in an annular groove 42 provided on the spindle 36. The spindle 36 carries a circular flange 44 which is provided with a plurality of circumferentially-spaced detents 46 forming a part of clutch 31 and coacting with a detent spring means 48 received in an annular recess 50 provided in the hub member 38. Rotation of the spring means 48 is prevented by a plurality of circumferentially-spaced protuberances 52 provided on the hub member 38 in the recess 50. The spindle 36 is provided with a reduced-diameter portion 54 adjacent the flange 44 for receiving a bushing member 56 engageable by a hub cap 58. Each hub cap 58 engages the axle means 16 with a friction fit for restraining the spindle 36 against axial displacement outwardly from the body 12. Each wheel substitute 30 also includes a suitable number, such as four, arms or spokes 60 formed integrally with the hub member 38 and extending radially and laterally-outwardly therefrom. Each spoke 60 includes a ground-engaging portion 62 which is provided with an integrally formed foot member 64 having a plurality of transverse grids 66 provided thereon for increasing frictional contact between an associated foot member 64 and the surface over which the toy 10 travels. Each hub means 34 is keyed to the shaft means 16 in such a manner that the arms 60 on one hub means 34. With this arrangement, two foot members 64 on one wheel substitute 30 may be in engagement with the surface while only one foot member 64 on the other wheel substitute 30 is in engagement with the surface. This produces an erratic, waddling-type of movement and assists the toy 10 in negotiating obstacles. Each arm 60 is relatively long in comparison with the length of the body 12 so that a circle inscribed by the foot members 64 extends forwardly of the body 12 further facilitating the negotiation of obstacles placed in the path of travel of the toy 10. Positioning the wheel substitutes 30 laterally-outwardly from the body 12 and extending the arms 60 laterally-outwardly from their associated hub means 34 not only minimizes the likelihood that the toy 10 will upset while negotiating obstacles, but also permits the toy 10 to be supported on its side by four foot members 64 on one wheel substitute 30 while the arms 60 on the other wheel substitute 30 are disposed in a horizontal plane above the body 12 which will then rotate about the axle means 16 while the wheel substitutes 30 remain stationary when motor means 14 is energized.

Figure 2:
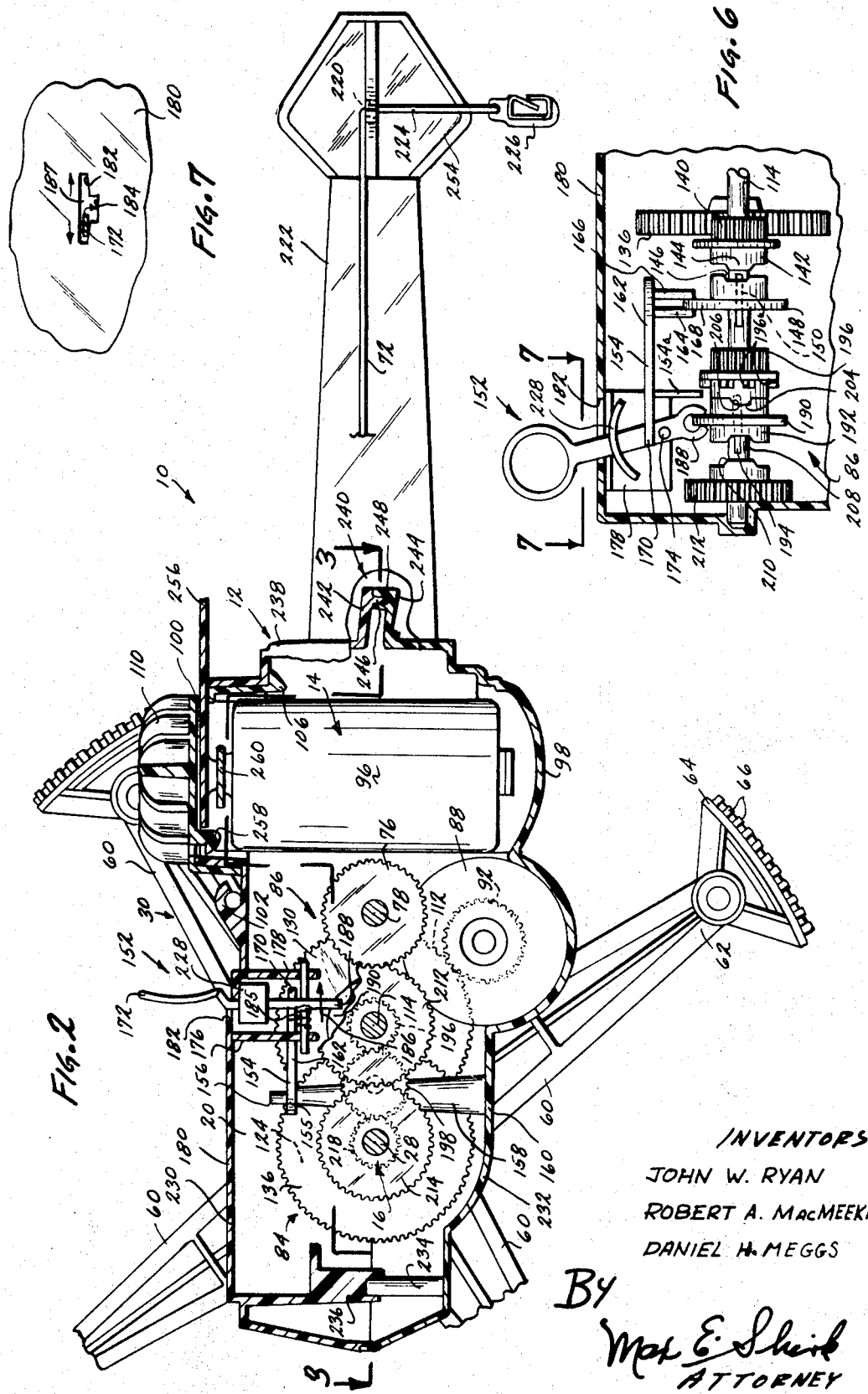
FIG. 2 is an enlarged, side elevational view of the toy of FIG. 1 with parts broken away to show internal construction.

The toy 10 also includes a winch 68 comprising a drum 70 upon which a cable 72 is coiled and a spindle 74 to which a winch gear 76 is affixed. The spindle 74 includes a first end 78 affixed to the drum 70 and rotatably mounted in the side wall 24 and a second end 80 rotatably mounted in a bearing block 82 provided in the body 12. The winch 68 may be rotated in both clockwise and counterclockwise directions and the axle means 16 may be rotated in a direction which moves the toy 10 forwardly by the motor means 14 through a gear train 84 and a clutch means 86. The motor means 14 may comprise an electric motor 88 having an output shaft 90 to which a pinion gear 92 is affixed. Current may be supplied to the motor 88 by a pair of dry cells 94, 96 which are mounted in a battery housing 98 provided in the body 12. The dry cells 94, 96 are retained in position in the housing 98 by a cover member 100 which is hingedly connected to the body 12 by a pair of hinges 102, 104 and which is retained in a closed position by a clip 106 (FIG. 2). The appearance of by body 12 is enhanced by providing the cover 100 with simulated, finned cylinder heads 108, 110.

Referring now to the several views in the drawings, the gear train 84 includes a first gear 112 rotatably mounted on a rotatable shaft 114 having a first end 116 journaled in the side wall 20 and a second end 118 journaled in the side wall 24. The first gear 112 includes a large-diameter portion 120 meshing with the pinion gear 92 on motor 88 and a small-diameter gear 122 meshing with a large-diameter portion 124 of a second gear 126 rotatably mounted on the axle means 16. The second gear 126 includes a small-diameter gear 128 meshing with a large-diameter gear 130 having a hub 132 keyed to the shaft 114 by a pin 134 for imparting rotation to the shaft 114.

The drive train 84 also includes a main drive gear 136 keyed to the axle means 16 by a pin 138 and meshed with a drive pinion 140 rotatably mounted on the shaft 114. The drive pinion 140 carries a hub 142 having circumferentially-spaced protuberances 144 provided on the end thereof and engageable by matching detents 146 provided on a clutch member 148 forming a part of the clutch means 86. The clutch member 148 is keyed to the shaft 114 by a key 150 which connects the clutch member 148 to the shaft 114 for rotation thereby without limiting axial movement of the clutch member 148 on the shaft 114 in to, and out of, operative association with the drive pinion 140 by a gear shift means 152 including an L-shaped bell crank 154 having one arm 155 pivotally connected to the body 12 by an upstanding pin 156 having an end 158 affixed to the bottom wall 160 of the body 12. The other arm 162 of crank 154 carries a pair of depending, spaced-apart pins 164, 166 caging a flange 168 carried by the clutch member 148. The arm 162 includes a bifurcated end 170 operatively associated with a gear shift lever 172 forming a part of the shifting means 152. The lever 172 is swingably and slidably mounted in the body 12 on a rod 174 supported by a pair of plates 176, 178 depending from the top wall 180 of body 12. The top wall 180 is provided with a T-shaped slot 182 (FIG. 7) through which the upper end 184 of lever 172 extends. The slot 182 includes a stem portion 184, in which the lever 172 is normally seated under the influence of a spring 185 encompassing rod 174 for sliding the lever 172 thereon rearwardly in the direction of arrow 186 (FIG. 2), and a crossbar portion 187, into which the lever 172 may be moved by sliding it forwardly on rod 174. The lever 172 includes a bifurcated end 188 caging a flange 190 carried by a second clutch member 192 keyed to the shaft 114 by a key 194. The key 194 connects the clutch member 192 to the shaft 114 for rotation thereby while leaving the clutch member 192 free to slide thereon when lever 172 is swung about rod 174. Swinging lever 172 to the left, as viewed in FIG. 6, slides clutch member 192 to the right into operative association with a first winch-driving gear 196 rotatably mounted on shaft 114 in meshed relation with an idler gear 198 (FIG. 3) rotatably mounted on a shaft 200 supported in body 12 on upstanding brackets 202. The clutch member 192 may be drivingly connected to the gear 196 by engaging protuberances, like the one shown at 204 in FIG. 6, in matching detents 206 provided on one end of clutch member 192. The other end of clutch member 192 is also provided with suitable detents, like the one shown at 208 in FIG. 6, engageable with matching protuberances 210 provided on a second winch-driving gear 212 rotatably mounted on shaft 114 in meshed relation with the gear 76 for rotating drum 70 in one direction. The gear 212 also meshes with a large-diameter gear 214 rotatably mounted on shaft 16 and including a hub portion 216 which carries a small-diameter gear 218 meshing with the idler 198. Thus, the clutch member 192 drives the drum 70 in one direction through gears 196, 198, 218, 214 and 212 and in the opposite direction through the gear 212.

Rotation of the drum 70 in one direction coils the cable 72 thereupon and rotation of the drum 70 in the other direction plays-out the cable 72 which is trained through an aperture 220 provided in a tail member 222 forming an integral part of the body 12. The cable 72 includes a free end 224 which carries a hook 226 for lifting objects, in a manner to be hereinafter described. When the drum 70 meets a predetermined resistance, which, for example, may be created when the hook 226 engages tail 222, the clutch member 192 will become disengaged returning to the position shown in FIG. 3 where the lever 172 is engaged in stem 184 and the clutch member 148 is engaged with the gear 140 for again rotating the wheel substitutes 30 through gear 136 and shaft 16. Thus, the toy 10 will lift a load until hook 226 engages tail 222 and then automatically move forwardly. Unwanted rotation of drum 70 at this time may be prevented by engagement of a pin 154a, which depends from lever 154, with one of a plurality of protuberances 196a carried by the gear 196. The introduction of foreign objects through the slot 182 may be minimized by providing an arcuate plate 228 on lever 172 subjacent the slot 182.

The body 12 includes an upper body half 230 and a lower body half 232 which are each made from a suitable rigid plastic material by molding operations and which are joined together by a plurality of upstanding pins 234 on bottom wall 160 engaging hollow bosses 236 depending from the top wall 180. The tail 222 is formed integrally with the lower body half 232 and includes a stepped portion 238 which abuts the upper body half 230. The body 12 also includes a pair of simulated exhaust horns 240 each of which includes an upper portion 242 formed on the upper body half 230 and a lower portion 244 formed on the lower body half 232. The upper portion 242 carries a pin 246 which may be engaged in a hollow boss 248 carried by the lower portion 244 for connecting the two portions together. The upper body half 230 includes a recessed portion 250 forming a cockpit in the body 12 and an upstanding member 252 forming a simulated control panel. The tail 22 is provided with a rudder 254 (FIG. 2) forming a ground-engaging member when the toy 10 is being propelled by the wheel substitutes 30.

The flow of electrical current from the batteries 94 and 96 to the electric motor 88 may be controlled by a switch lever 256 which is swingably connected to the cover 100 by a hooked member 258 and which carries a pair of electrical contacts, like the one shown at 260 in FIG. 2, engageable with the batteries 94 and 96.

In use, the toy 10 may be moved over a suitable surface by actuating switch 256 with the lever 172 positioned in stem portion 184 of notch 182. Since the arms 60 extend well forwardly of the body 12 and the arms 60 on one wheel substitute 30 are positioned intermediate the arms 60 on the other wheel substitute 30, the toy 10 may be caused to negotiate obstacles placed in its path of travel. Forward travel may be arrested at any time by pushing the lever 172 forwardly disengaging clutch member 148. The hook 226 may then be played out behind toy 10 by swinging the lever 172 to the right, as viewed in FIG. 6, engaging clutch member 192 with gear 212 for rotating the drum 70 in a counterclockwise direction, as viewed in FIG. 1. The hook 226 may then be attached to an object and this object may be drawn up to the toy 10 by swinging the lever 172 to its FIG. 6 position engaging clutch member 192 with gear 196 for rotating the drum 70 in a clockwise direction through idler 198, gear 218, gear 214, gear 212 and gear 76. When hook 226 engages tail 222, the resistance offered thereby snaps the clutch member 192 out of engagement with gear 196 whereupon spring 185 seats lever 172 in stem portion 184 of slot 182 locking winch-driving gear 196 by pin 154a and moving clutch member 148 into engagement with drive pinion 142 for imparting rotation to the main drive gear 136. This imparts rotation to the wheel substitutes 30 for again moving the toy 10 forwardly.

The toy 10 may be positioned on an elevated surface, such as a table or the like, with the tail 222 extending over the edge thereof. The hook 226 may then be used to elevate objects up to the table. Alternatively, the toy 10 may be placed on its side so that it is supported by the four ground-engaging members 64 provided on the side adjacent to the drum 70 so that the tail 222 is elevated. The hook 226 may then again be used for elevating objects.

While the particular self-propelled, crawling toy herein shown and described in detail is fully capable of attaining the objects and providing the advantages hereinbefore stated, it is to be understood that it is merely illustrative of the presently preferred embodiment of the invention.

What is claimed is:

1. In combination with a toy vehicle motor having an output shaft for powering said vehicle, clutch apparatus, comprising:
   shaft means rotatably mounted in said vehicle;
   gear means mounted on said shaft means and drivingly connected to said output shaft for rotation thereby;
   hub means carried by said gear means, said hub means having detents provided thereon; and
   clutch means keyed to, and axially slideable on, said shaft means adjacent said detents, said clutch means including protuberances engageable with said detents for transmitting power from said output shaft to said shaft means through said gear means, said hub means and said clutch means, said protuberances becoming disengaged from said detents when said clutch means is subjected to a predetermined load.

2. A combination as stated in claim 1 wherein said shaft means includes a pair of shafts and wherein said gear means includes at least one gear on each shaft.

3. A combination as stated in claim 2 wherein at least one of said gears is keyed to its shaft and the remaining gears are rotatably mounted on their shafts.

4. A combination as stated in claim 1 wherein said motor operates said vehicle in two modes, wherein said gear means includes a plurality of gears, wherein said hub means includes a detent-carrying hub on each of at least two of said gears and wherein said clutch means includes a clutch member for each hub.

5. a gear train and clutch arrangement for a toy vehicle having a motor including an output pinion, comprising:
   a pinion gear carried by said motor for rotation thereby;
   first and second shafts rotatably mounted in said vehicle;
   a first gear rotatably mounted on one of said shafts, said first gear including a large-diameter portion meshing with said output pinion and a small-diameter portion;
   a second gear rotatably mounted on the other of said shafts, said second gear including a large-diameter portion meshing with said small-diameter portion on said first gear and a small-diameter portion;
   a third gear keyed to said one shaft for imparting rotation thereto, said third gear being meshed with said small-diameter portion of said second gear;

a drive pinion rotatably mounted on said one shaft, said drive pinion including a clutching face;
a fourth gear keyed to said other shaft, said fourth gear meshing with said drive pinion;
a first clutch member slidably mounted on said one shaft adjacent said clutching face on said drive pinion, said first clutch member being keyed to said one shaft for rotation thereby and being adapted to be slid into engagement with said clutching face on said drive pinion for imparting rotation thereto;
a fifth gear rotatably mounted on said other shaft, said fifth gear including a small-diameter portion and a large-diameter portion;
a sixth gear rotatably mounted on said one shaft, said sixth gear including a clutching face;
an idler gear meshing said sixth gear with the small-diameter portion of said fifth gear;
a seventh gear rotatably mounted in said vehicle;
an eighth gear rotatably mounted on said one shaft, said eighth gear including a clutching face and being meshed with said seventh gear and said large-diameter portion of said fifth gear; and
a second clutch member keyed to said one shaft for said eighth gear including a clutching face and being slidably mounted on said shaft for selective engagement with said clutching face on said sixth gear and said clutching face on said eighth gear, whereby said seventh gear may be rotated in first and second directions, respectively.

References Cited

UNITED STATES PATENTS 3,061,972  11/1962  Wigal _____ 46—206

LEONARD H. GERIN, Primary Examiner

U.S. Cl. X.R.

46—206, 211